Oct. 4, 1932.   D. C. CORNER   1,881,263
LOADING MACHINE
Filed June 29, 1929
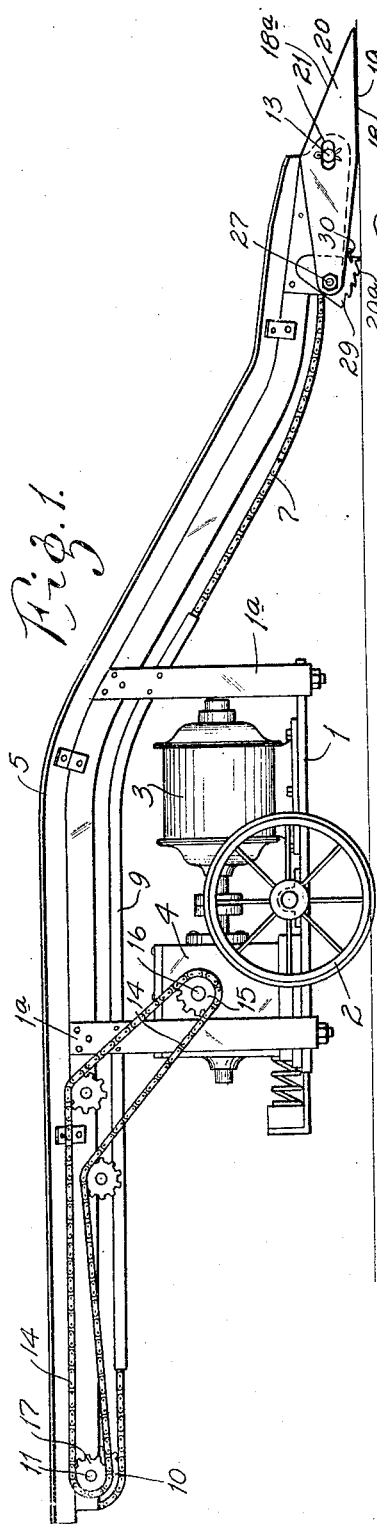
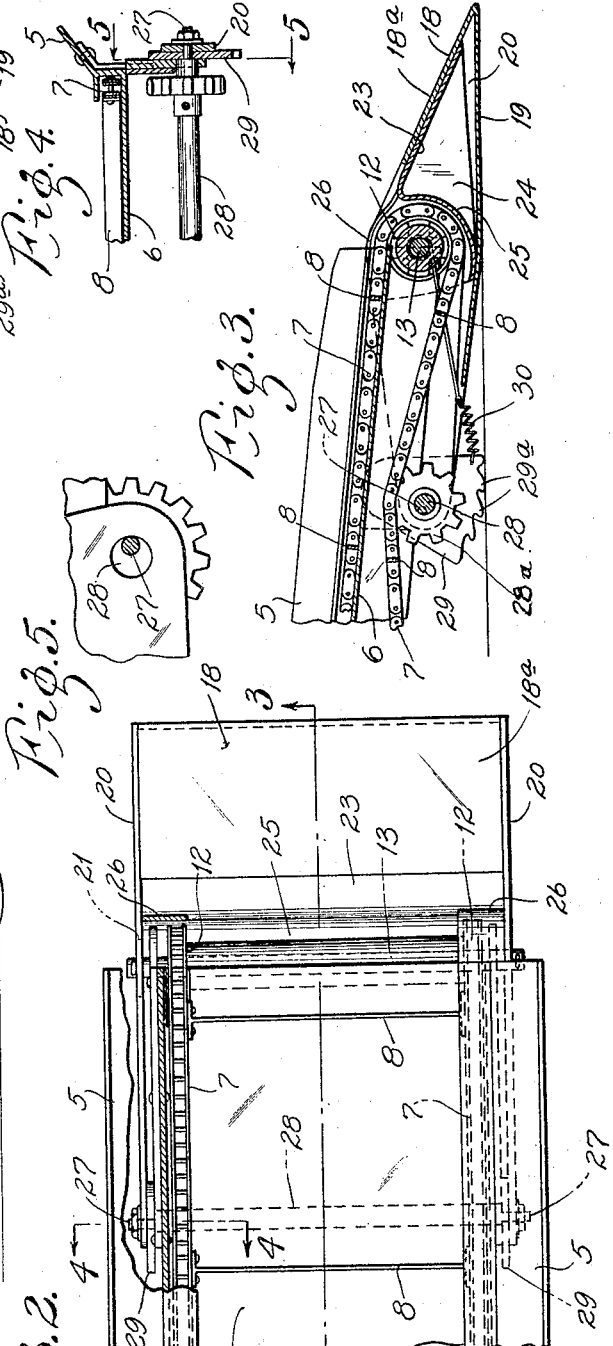
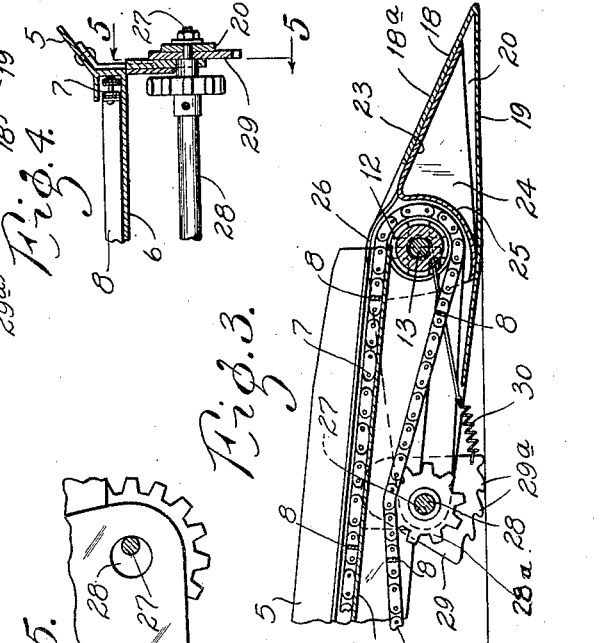
INVENTOR
Douglas C. Corner
HIS ATTORNEYS Patented Oct. 4, 1932

1,881,263

UNITED STATES PATENT OFFICE

DOUGLAS C. CORNER, OF WEBSTER GROVES, MISSOURI, ASSIGNOR TO ST. LOUIS POWER SHOVEL COMPANY, OF ST. LOUIS, MISSOURI, A CORPORATION OF MISSOURI

LOADING MACHINE

Application filed June 29, 1929. Serial No. 374,842.

This invention relates to loading machines of the portable conveyor type for picking up material from a pile and elevating it to a vehicle or other conveyor.

One of the principal objects of the present invention is to secure a forward step by step movement of the machine for crowding the shovel end thereof into the pile of material to gather the same onto the conveyor. Another principal object is to provide means for imparting an orbital movement to the shovel longitudinally of the machine and for raising and lowering the digging edge thereof during such movement, thereby enabling the shovel to more easily penetrate the pile. Other objects are simplicity and cheapness of construction and compactness of design. The invention consists in the loading machine and in the construction, combinations and arrangements of parts hereinafter described and claimed.

In the accompanying drawing, which forms part of this specification and wherein like symbols refer to like parts wherever they occur, Fig. 1 is a side elevation of a loading machine embodying my invention, Fig. 2 is an enlarged plan view of the shovel end of the machine, Fig. 3 is a vertical longitudinal section on the line 3—3 in Fig. 2, Fig. 4 is a vertical transverse section on the line 4—4 in Fig. 2; and Fig. 5 is a fragmentary side view of the machine, showing an eccentric pin for actuating the shovel in the crowding legs.

Referring to the accompanying drawing, my invention is shown in connection with a loading machine of the portable conveyor type for picking up material from a pile and elevating it to a vehicle or other conveyor. Said machine comprises a suitable platform 1 mounted on wheels 2 and supporting an electric motor 3 and a housing or casing 4 containing a suitable transmission gearing (not shown) that is driven by said motor. Supported on upright frame members 1a located at the four corners of the wheeled platform 1 of the machine is a conveyor comprising a way that extends transversely of the wheel axes and is made up of spaced side rails 5 connected by a bottom plate 6. The way has an upwardly and rearwardly inclined elevating portion disposed with its front or receiving end close to the ground, and a raised portion located above the wheeled platform and extending rearwardly therefrom far enough to overhang the vehicle that is to be loaded.

The mechanism propelling the material along the conveyor way from the receiving end thereof to the discharge end thereof comprises two endless sprocket chains that extend longitudinally of said way on opposite sides thereof and are connected at spaced intervals by pusher bars or flights 8. The upper stretches of the endless conveyor chains 7 rest on the upper surface of the conveyor way and are adapted to travel rearwardly thereon, while the lower stretches of said chains are located below said way and are supported for a portion of their lengths on angle bars 9 fixed to the uprights 1a of the platform 1. At the rear or discharge end of the conveyor the conveyor chains 7 are supported on and driven by sprocket wheels 10 fixed to a cross-shaft 11 journaled in suitable bearings provided therefor in the side rails 5 of the conveyor way. At the front end of the conveyor the conveyor chains 7 pass around and are supported on idler rollers 12 that are journaled on a cross-shaft 13 whose ends are supported in the side rails of the conveyor way. The conveyor chains 7 are driven from the gear casing 4 by means of an endless sprocket chain 14 that cooperates with a sprocket wheel 15 fixed to a driving shaft 16, which projects from one side of said gear casing, and a sprocket wheel 17 fixed to the end of the shaft 11 that carries the drive sprocket wheel 10.

Located at the forward or receiving end of the conveyor is a shovel or scoop 18 comprising a bottom plate 19 provided with upstanding side walls 20 having opposing slots 21 therein adapted to receive the projecting end portions of the cross-shaft 13 that supports the idler rollers 12 for the front end of the sprocket chains. The portion of the shovel located forwardly of the supporting shaft therefor has a top plate 18a that slopes downwardly from about the plane of the bottom plate 6 of the conveyor way to the front edge of said shovel, thereby forming a hollow wedge-shaped shoveling or digging lip. Located inside the hollow wedge-shaped digging lip of the shovel 18 is a member having an inclined top plate 23 provided with depending side walls 24 that are supported at their rear ends on the cross-shaft 13. As shown in the drawing, the top plate 23 is curved downwardly, as at 25, beneath the shaft 13, sufficient space being left between said curved portion and the ends of the conveyor chains for the rising flights of the conveyor chains. At each side of the conveyor the inclined top plate 23 is provided with rearwardly extending extensions or tabs 26 that cover and protect the adjacent ends of the conveyor chains.

At the rear end of the shovel 18, the side walls 20 thereof are provided with alined circular openings adapted to snugly fit eccentric pins or cranks 27 provided therefor on the ends of a cross-shaft 28, which has sprocket wheels 28a fixed thereto that are continuously driven by the forwardly traveling lower stretches of the conveyor chains 7. With this arrangement, the movement of the eccentric pins 27 of the continuously rotating cross-shaft 28 imparts an orbital movement to the shovel, that is, it has a to-and-fro movement longitudinally of the machine and is also caused to rock upon the ends of the transverse idler shaft 13 during such movement, thereby enabling the shovel to penetrate the pile of material.

A step by step forward movement is imparted to the loading machine to crowd the shovel 18 thereof into the pile of material by means of crowding legs 29 located at each side of the conveyor way between the side rails 5 thereof and the side walls 20 of said shovel. These crowding legs 29 are journaled on the eccentric end portions 27 of the driven cross-shaft 28 and have their lower ground engaging edges convexly curved after the manner of a rocker and provided with teeth 29a for enabling said edges to grip the ground. Coil springs 30 are connected at one end to the forward edges of the rockers or crowding legs 29, and at the other end to the non-rotatable shaft 13 that supports the idler rollers 12. With this arrangement, when the eccentric end portions or cranks 27 of the continuously rotating cross-shaft 28 are in their uppermost positions, the crowding legs 29 and the inner end of the shovel 18 are raised and the outer end of said shovel is swung downwardly and rests on the ground. In this position of the parts, the weight of the forward portion of the machine is taken off the crowding legs 29, thereby permitting the toothed lower ends of said legs to be swung forwardly and downwardly by the springs 30 until they strike the ground. The eccentrics then swing forwardly and downwardly, lifting the outer or digging edge of the shovel 18 off the ground and transferring the weight of the machine to the crowding legs 29 at points located forward of the points where their toothed lower edges engage the ground, thereby causing said legs to rock forwardly and move the entire machine one step forward. At the beginning of each forward step of the machine, the shovel is moved outwardly and its outer end is lifted off the ground; and at the end of each forward step of the machine, said shovel is drawn inwardly and its outer end strikes the ground.

Obviously, the hereinbefore described machine admits of considerable modification without departing from the invention. Therefore, I do not wish to be limited to the precise arrangement shown and described.

What I claim is:

1. In a loading machine of the portable endless conveyor type, legs for supporting the receiving end of said conveyor, means for driving the conveyor, and means operated by said conveyor for actuating said legs for imparting a step by step forward movement to said machine.

2. In a loading machine of the portable endless conveyor type, means for driving the conveyor, a shovel mounted on the receiving end of said conveyor, legs for supporting the receiving end of said conveyor, and means operated by the driving means for said conveyor for actuating said legs for imparting a continuous step by step forward movement to said machine and for imparting a continuous longitudinal to-and-fro movement to said shovel.

3. In a loading machine of the portable endless conveyor type, means for driving the conveyor, a shovel mounted on the receiving end of said conveyor, legs for supporting the receiving end of said conveyor, and means operated by the conveyor driving means for actuating said legs to impart a continuous step by step forward movement to said machine.

4. In a loading machine of the portable endless conveyor type, means for driving the conveyor, a shovel mounted on the receiving end of said conveyor for vertical oscillating and longitudinal reciprocating movement, and a shaft driven by said conveyor and having an eccentric connection with said shovel for oscillating and reciprocating the same.

5. In a loading machine of the portable inclined conveyor type, means for driving the conveyor, legs for supporting the receiving end of said conveyor, wheels for supporting the discharge end thereof, and a cross-shaft driven by the conveyor and having eccentric connections with said legs adapted to impart a longitudinal oscillating movement thereto, thereby securing a step by step forward movement of said machine.

6. In a loading machine of the portable inclined conveyor type, means for driving the conveyor, legs for supporting the receiving end of said conveyor, wheels for supporting the discharge end thereof, and a cross-shaft driven by the conveyor and having eccentric connections with said legs adapted to impart a longitudinal oscillating movement thereto, thereby securing a step by step forward movement of said machine, said legs being provided with convexly curved ground engaging surfaces.

7. In a loading machine of the portable inclined conveyor type, means for driving the conveyor, legs for supporting the receiving end of said conveyor, wheels for supporting the discharge end thereof, and a cross-shaft driven by the conveyor and having eccentric connections with said legs adapted to impart a longitudinal oscillating movement thereto, thereby securing a step by step forward movement of said machine, said legs being provided with convexly curved ground engaging surfaces having series of teeth thereon, and springs tending to swing said legs forward.

8. In a loading machine of the portable inclined conveyor type, means for driving the conveyor, legs for supporting the receiving end of said conveyor, wheels for supporting the discharge end thereof, a shovel mounted on the receiving end of said conveyor, and a cross-shaft driven by said conveyor and having eccentric connections with said legs and said shovel for imparting a longitudinal oscillating movement to said legs and a combined transverse rocking and longitudinal to-and-fro movement to said shovel.

9. In a loading machine of the portable endless conveyor type, means for driving the conveyor, said conveyor including a driven cross-shaft journaled in said machine at the receiving end of said conveyor, a shovel mounted on said cross-shaft for vertical oscillating and longitudinal reciprocating movement relative to said conveyor, and a second cross-shaft journaled in said machine parallel with said first mentioned cross-shaft and driven by said conveyor driving means and having eccentric connections with said shovel for actuating the same.

10. In a loading machine of the portable conveyor type, means for driving the conveyor, said conveyor including a driven cross-shaft at the receiving end thereof, and a shovel mounted intermediate its ends on said shaft, said shovel comprising a bottom plate provided with upstanding side walls having elongated slots therein adapted to receive the ends of said cross-shaft and an inclined top plate that slopes downwardly from the receiving end of said conveyor to the front edge of said bottom plate, and a member located between the top and bottom plates of said shovel, said member comprising an inclined top plate adapted to cooperate with the inclined top plate of said shovel and having depending side walls provided with openings adapted to receive said cross-shaft.

11. In a loading machine of the portable conveyor type, means for driving the conveyor, said conveyor including a driven cross-shaft at the receiving end thereof, and a shovel mounted intermediate its ends on said shaft, said shovel comprising a bottom plate provided with upstanding side walls having elongated slots therein adapted to receive the ends of said cross-shaft and an inclined top plate that slopes downwardly from the receiving end of said conveyor to the front edge of said bottom plate, and a member located between the top and bottom plates of said shovel, said member comprising an inclined top plate adapted to cooperate with the inclined top plate of said shovel and having depending side walls provided with openings adapted to receive said cross-shaft, the top plate of said member having its inner end portion curved downwardly beneath said cross-shaft.

Signed at St. Louis, Missouri, this 27th day of June, 1929.

DOUGLAS C. CORNER.